Feb. 6, 1951     L. P. MACARDIER     2,540,898
STOP JOINT FOR USE ON OIL FILLED CABLES
Filed May 20, 1946

INVENTOR
LOUIS PIERRE MACARDIER

By A. D. Adams

ATTORNEY

Patented Feb. 6, 1951

2,540,898

UNITED STATES PATENT OFFICE 2,540,898

STOP JOINT FOR USE ON OIL-FILLED CABLES

Louis Pierre Macardier, Lyon, France, assignor to Compagnie Generale d'Electricite, Paris, France Application May 20, 1946, Serial No. 670,969
In France May 17, 1944

Section 1, Public Law 690, August 8, 1946
Patent expires May 17, 1964

5 Claims. (Cl. 174—22)

My invention relates to a junction box for connecting oil-filled electric cables, and particularly to the kind of junction box usually called a stop joint in which the electric conductors of the two cables are connected together but a partition prevents any circulation of oil between the two cables.

In the prior art, it has been known to use in oil-filled cables stop joints intended, on the one hand, for electrically interconnecting two lengths of such a given cable and, on the other hand, for hermetically separating such lengths from each other so as to avoid any oil circulation therebetween. To that effect, in the prior art each of the end portions of cable lengths to be interconnected is inserted into an insulating tube, the opposed ends of these two tubes being closed hermetically by appropriate means adapted to expand a packing. By thus closing the two adjacent opposed ends of the two lengths of cable, there is prevented any flow of insulating liquid medium from one length of cable to the other. Such means are separate from the means for effecting the electric interconnection of the cable lengths under consideration, and in these prior art devices such separation has for its result an arrangement whose metal parts are so bulky that the final diameter of the stop joint becomes too large.

It is an object of the present invention to provide a stop joint for oil-filled cables having a final diameter considerably smaller than that of similar joints heretofore in use.

A further object of the present invention is to provide a heavy duty stop joint for oil-filled cables in which potential gradient stresses due to dielectric characteristics of the cable surrounding the insulating tube are eliminated or decreased.

According to one feature of the present invention, there are provided, to constitute a stop joint for oil-filled cables, two suitable coaxially relatively displaceable interengageable sleeve elements interposed between the two cable lengths under consideration for maintaining the latter electrically connected, and an insulating tube disposed around said displaceable elements so as to form two compartments each containing an end of one of said cable lengths, said compartments being separated from each other by a suitable packing sleeved in between said displaceable elements and said tube.

According to a further feature of the present invention, there are provided, to constitute a stop joint for oil-filled cables, two coaxially threaded sleeve elements relatively displaceable in threaded relation and each electrically connected with the respective end of the conductor of a cable length so as to maintain the two cable lengths electrically connected, and an insulating tube disposed around said threaded elements so as to form two compartments each containing the end of one of said cable lengths, said compartments being hermetically separated from each other by a suitable packing disposed between said threaded elements and said tube and squeezed tight by screwing said threaded sleeve elements together.

According to yet a further feature of the present invention, two coaxially displaceable elements of a stop joint for oil-filled cables, serving to maintain the two cable lengths under consideration electrically connected, are assembled into H formation, and a suitable packing material is disposed concentrically on the middle cross bar of said H and caused by relative transverse displacement of the vertical limbs thereof to press against the surrounding insulating tube so as to form two hermetically separated compartments each containing an end of one of said cable lengths.

According to a still further feature of the present invention, there are provided, in a stop joint as above described, for oil-filled cables, an insulating member comprising metal intersheaths disposed within the insulating tube in the vicinity of two coaxially displaceable elements for eliminating or decreasing potential gradient stresses due to dielectric characteristics of said insulating tube. A first layer of such metal foil layers or intersheaths may be arranged to be electrically connected with said displaceable elements, while an outside layer thereof may be surface-metallized, and the whole assembly of such insulation and intersheaths is preferably shaped to form a double truncated cone.

Other features of the present invention will be apparent from the following description with reference to the accompanying drawings which show by way of example two embodiments of the present invention, and in which.

Figure 1:
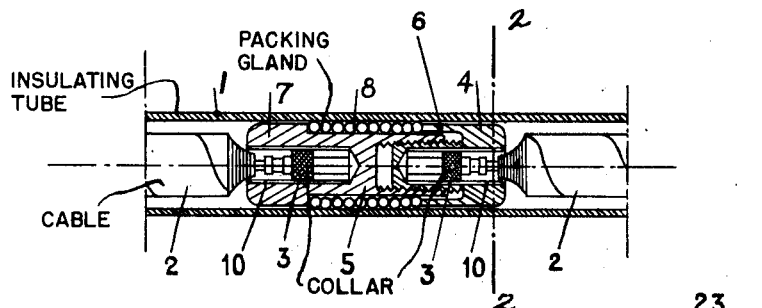
Fig. 1 is an axial sectional view showing one embodiment of the present invention.
Figure 2:
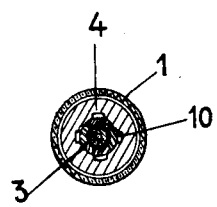
Fig. 2 is a cross-sectional view through the line A—A of Fig. 1.
Figure 3:
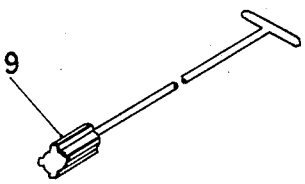
Fig. 3 is a perspective view showing a wrench for tightening the stop joint shown in Figs. 1 and 2.

Referring to Figs. 1 to 3, located within a resin impregnated paper tube 1, are two ends of cable lengths 2, 2, intended to be electrically interconnected. Each end of the two conductors of the cable lengths is made fast, by welding or pressing, to a binding metallic collar 3, of which there is one collar for each of the two cable ends. One of these collars 3 shown on the right is held in contact with a cylindrical metallic body or sleeve 4 having an externally threaded central inner ring portion 4a of reduced diameter, and an overhanging flanged cap 6, forming an annular recess therebetween, while the other collar 3 is held in contact with a cylindrical metallic body or sleeve 5 having an internally threaded flanged restricted terminal portion and a flange-like head 7. The externally threaded portion of body or sleeve 4 may be screwed into the internally threaded flanged portion of body 5. The cap 6 and head 7 are of approximately equal diameters which are slightly smaller than the internal diameter of the insulating tube 1. When both terminal portions are screwed together, the assembly 4—5 has the shape of an H. Between the cap 6 and the head 7, around the middle bar of said H, is disposed a packing gland 8. This may include gaskets made of rubber or of oil-resisting plastic material, or better still rubber gaskets and metal gaskets set in alternately. Metal gaskets should preferably be of torus-shape which, without impairing good behavior of the packing, permits to avoid sharp angles, thereby improving electric behavior of the joint. It is seen from Fig. 1 that in order to obtain the electric interconnection of the two threaded metallic bodies 4 and 5, as well as the hermetically tight separation of the two compartments at the opposite ends of the insulating tube 1 enclosing the corresponding cable lengths, it is sufficient to screw the terminal portion of body 4 into the flanged terminal portion of body 5.

To readily effect such screwing, there may be used two wrenches such as the one shown in Fig. 3, that is provided with longitudinal splines 9 adapted to slide into corresponding grooves 10 (Fig. 2) formed in the threaded bodies 4 and 5.

Figure 5:
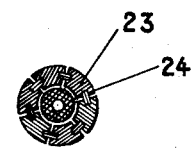
Fig. 5 is an enlarged cross-section of the binding collars of Fig. 1, attached to the two cable ends, and having spring positioned contact blades.

The threaded sleeve elements 4 and 5 are each provided with a bore adapted to receive the binding collars 3, and the electric interconnection is obtained, in a known manner, by means of movable blades located on the periphery of said collars 3 and held applied against the internal wall of pieces 4, 5 by springs housed in the binding collars 3. Fig. 5 shows an enlarged cross-section of such a binding collar 3, having displaceable copper contact blades 23, and spring members 24 keeping these contact blades 23 spaced apart.

In stop joints of the type herein above described operating under high tensions, there occur considerable potential gradient stresses due to dielectric characteristics of the insulating resin impregnated paper tube in the vicinity of the binding collars. The modified embodiment of the present invention shown in Fig. 4 permits such potential gradient stresses to be eliminated or decreased.

Figure 4:
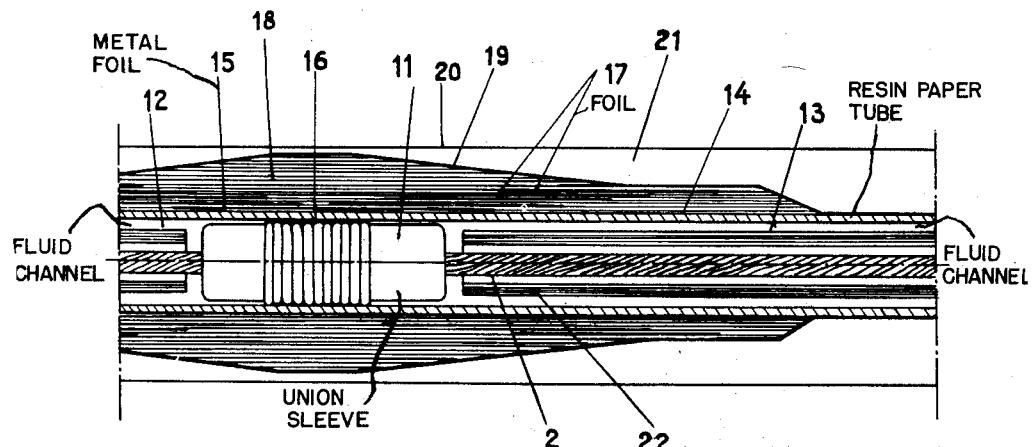
Fig. 4 is an axial view showing another modified embodiment of the present invention with a wound insulation head comprising metal foil intersheaths.

Referring to the modified form of Fig. 4, 11 designates the metallic union sleeve described in connection with the form of Figs. 1, 2 and 3, and now hermetically separating from each other the compartments 12 and 13 defined with resin paper tube 14 on the two respective sides of sheath 11, and in which compartments the impregnating insulating fluid circulates. The insulating sleeve 11 is received within a resin impregnated paper tube 14. This is surrounded with an insulating material head consisting preferably of wound narrow strips of paper previously impregnated with fluid oil. This insulating head is provided with different metallic interleaved foil layers or intersheaths. A foil layer located close to the resin impregnated tube is designated by 15; it may be electrically connected as at 16 with the sleeve 11, for example by means of a screw engaged through the resin impregnated paper tube 14. If several screws be employed, they should be disposed circumferentially in a plane perpendicular to the stop joint axis. Designated by 17 are intermediate metal foil layers or intersheaths inserted into the insulating wound head 18, and by 19 is designated the outermost metal foil layer covering the insulating head 18. The outermost metallic layer 19 covering the entire surface of the insulating head 18 may be constituted by metallizing this surface. A joint thus formed is fitted into a casing 20 defining a compartment 21 bounded on one side by the insulating tube 14 and the outer metallic layer 19. In Fig. 4, the normal thickness of the regular insulation of the cable is shown at 2, and the additional applied insulation is shown at 22.

In order to obtain a good distribution of potential between the various metal intersheaths, it is useful to impart to the wound insulating head 18 not a uniform shape throughout its length, but the shape of a double truncated cone as shown in Fig. 4. Indeed, without such shape of a double truncated cone decreasing the capacity between the intermediate intersheaths and the outermost metallic layer, such decreasing being more important with respect to the intermediate intersheaths in the vicinity of the tube 14, it would not be possible sufficiently to modify the radial distribution of potential by a mere variation of the length of the intersheaths.

A stop joint according to the present invention may be made almost entirely in the factory, thereby economizing time and labor in the field at the spot of insulation.

At the spot of installation, it is sufficient to fix the binding collars 3 and reinforce the insulation at the ends of cable lengths to be interconnected. Upon introducing these ends into the compartments 12 and 13, an exterior coupling box (not shown) is tightly welded to the leaden envelopes of the cables, whilst the compartments 12 and 13 are filled with oil.

Having thus described my invention, what I claim as new and desire to secure by Letters Patent is:

1. In a stop joint for connecting oil-filled cables, an insulating tube, a first sleeve member having a head portion at one of its ends and an externally threaded tail portion of reduced diameter at the other of its ends, and further having an external flange extending from its said head portion and having substantially the same external diameter as said head portion and forming with its said tail portion an annular recess, a second sleeve member having a head portion at one of its ends and a tail portion of reduced diameter at the other of its ends which is provided with an axial threaded bore extending from its end of reduced diameter, the threads of said axial bore being adapted to engage the external threads of said tail portion of said first sleeve member, and the annulus surrounding said axial bore of the tail portion of said second sleeve member being receivable in said annular recess of said first sleeve member, the diameters of said head portions of said two sleeve members being substantially equal to each other and to the inner diameter of said insulating tube, a packing member positioned in the space between said tail portion of said second sleeve member and said tube and being laterally compressible between the head of said second sleeve member and said flange of said first sleeve member by screwing said sleeve members together, said two sleeve members being provided with axial bores extending from their head ends and adapted to receive the conductors of the cables to be connected, and means engageable with said conductors and with said last mentioned axial bores for electrically connecting said conductors to said sleeve members, whereby said packing member hermetically separates the two chambers within said insulating tube on the respective sides of said sleeve members.

2. A joint according to claim 1, said means engageable with said conductors and said bores being collars fixedly attached to said conductors, and each said collar comprising spring urged blades extending radially from its periphery and engageable with the walls of said bores.

3. A joint according to claim 1, said insulating tube being slightly elastic.

4. In a stop joint for connecting oil-filled cables, an insulating tube, a first sleeve member having a head portion at one of its ends and an externally threaded tail portion of reduced diameter at the other of its ends, and further having an external flange extending from its said head portion and having substantially the same external diameter as said head portion and forming with its said tail portion an annular recess, a second sleeve member having a head portion at one of its ends and a tail portion of reduced diameter at the other of its ends which is provided with an axial threaded bore extending from its end of reduced diameter, the threads of said axial bore being adapted to engage the external threads of said tail portion of said first sleeve member, and the annulus surrounding said axial bore of the tail portion of said second sleeve member being receivable in said annular recess of said first sleeve member, the diameters of said head portions of said two sleeve members being substantially equal to each other and to the inner diameter of said insulating tube, a packing member positioned in the space between said tail portion of said second sleeve member and said tube and being laterally compressible between the head of said second sleeve member and said flange of said first sleeve member by screwing said sleeve members together, said two sleeve members being provided with axial bores extending from their head ends and adapted to receive the conductors of the cables to be connected, and means engageable with said conductors and with said last mentioned axial bores for electrically connecting said conductors to said sleeve members, whereby said packing member hermetically separates the two chambers within said insulating tube on the respective sides of said sleeve members, and a wound insulation member having the form of a double cone with common base and having metal intersheaths inserted between wound paper layers, said insulation member surrounding said tube with its maximum diameter over said sleeve members, and electrical connecting means extending through said tube and connecting the innermost of said intersheaths to said sleeve members, and a casing surrounding said insulating member and said tube.

5. In a stop joint for connecting oil-filled cables, an insulating tube, a pair of sleeve members having head portions of diameters which are substantially equal to each other and to the inside diameter of said tube, said sleeve members having tail portions of reduced diameter which are mutually engageable in threaded relation, said sleeve members including their said portions forming within said tube an annular space bounded by a said tail portion and said head portions, a packing member positioned in said annular space, the head portions of said sleeve members being respectively provided with means for receiving and holding in electrical connecting relation the conductors of said cables, whereby the screwing together of said sleeve members squeezes said packing member to completely and tightly fill the space between said sleeve members and said tube and to hermetically separate the spaces within said tube on opposite sides of said sleeve members.

LOUIS PIERRE MACARDIER.

REFERENCES CITED

The following references are of record in the file of this patent:

UNITED STATES PATENTS

| Number | Name | Date |
|---|---|---|
| 1,948,964 | Gay | Feb. 27, 1934 |
| 1,950,608 | Hanson | Mar. 13, 1934 |
| 1,986,843 | Meyer et al. | Jan. 8, 1935 |
| 2,239,900 | Papp | Apr. 29, 1941 |